Figure 1:
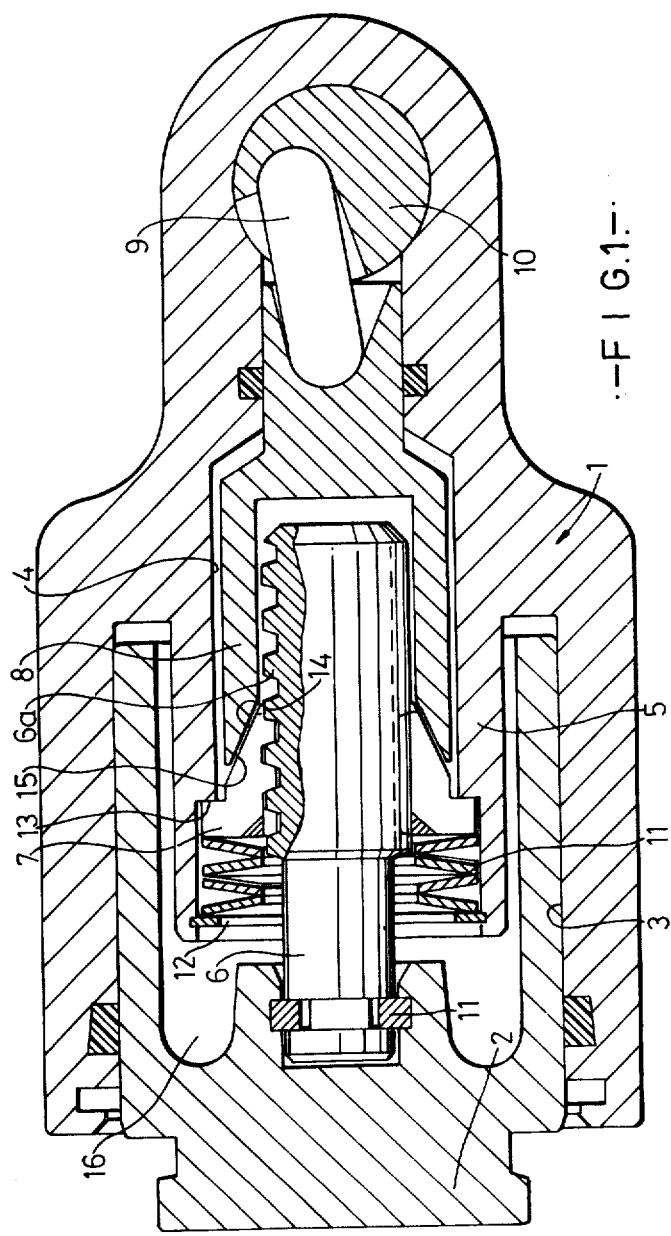

United States Patent [19]

Baum

[11] 4,378,863
[45] Apr. 5, 1983

[54] AUTOMATIC ADJUSTER FOR HYDRAULIC BRAKE ACTUATOR

[75] Inventor: Heinz W. Baum, Saarbrucken-Dudweiler, Fed. Rep. of Germany

[73] Assignee: Lucas Industries Limited, Birmingham, England

[21] Appl. No.: 180,948

[22] Filed: Aug. 25, 1980

[30] Foreign Application Priority Data

Aug. 30, 1979 [GB] United Kingdom ............... 7930119

[51] Int. Cl.³ .......................................... F16D 65/40
[52] U.S. Cl. .............................. 188/71.8; 188/71.9; 188/196 D; 188/72.8
[58] Field of Search ........... 188/196 C, 196 D, 196 P, 188/196 R, 196 V, 71.8, 71.9, 72.8

[56] References Cited

U.S. PATENT DOCUMENTS

| | | | |
|---|---|---|---|
| 3,442,357 | 5/1969 | Farr | 188/196 D |
| 3,610,373 | 10/1971 | Burnett | 188/196 D |
| 3,783,981 | 1/1974 | Burgdorf | 188/71.9 |
| 3,952,845 | 4/1976 | Asquith | 188/196 D |
| 4,180,146 | 12/1979 | Airheart | 188/71.9 |

FOREIGN PATENT DOCUMENTS

| | | | |
|---|---|---|---|
| 52-22666 | 2/1977 | Japan | 188/71.9 |
| 1152712 | 5/1969 | United Kingdom | |
| 1343111 | 1/1974 | United Kingdom | |
| 1434369 | 5/1976 | United Kingdom | 188/71.9 |
| 1439758 | 6/1976 | United Kingdom | 188/71.9 |

Primary Examiner—Douglas C. Butler
Assistant Examiner—Richard R. Diefendorf
Attorney, Agent, or Firm—Scrivener, Clarke, Scrivener and Johnson

[57] ABSTRACT

The adjuster has a clutch mechanism operative between an actuator piston and an auxiliary mechanical actuator. The clutch mechanism includes a first member and a second member, one of the members being connected to the actuator piston for axial movement therewith at all times in both directions and the other of the members being connectible with the mechanical actuator. The one member is free to move back and forth with the actuator piston during normal service brake applications, the other member not hindering its movement. Also, the other member is only moved to engage the one member upon actuation of the mechanical actuator. Thus the actuator piston is free to move back during "knockback" and normal braking is not hindered by the clutch mechanism.

6 Claims, 2 Drawing Figures

AUTOMATIC ADJUSTER FOR HYDRAULIC BRAKE ACTUATOR

DESCRIPTION

The present invention relates to an automatic slack adjuster for vehicle brakes.

As is well known; it is desirable to limit the return travel of a brake actuating member, such as a hydraulic piston, of a vehicle brake system so that excessive pedal or hand lever, travel will not be encountered the next time the brakes are applied. An automatic brake adjuster such as disclosed in our British patent specification No. 1,343,111, may be provided, such an adjuster coming into operation when the travel of the brake actuating member in the brake-applying direction, is in excess of the desired travel e.g. after brake lining wear has taken place. Upon such excessive travel the adjuster adjusts the limit of return travel of said brake actuating member which occurs when the brakes are released.

In British patent specification No. 1,343,111 the adjuster comprises an actuator piston arranged for limited axial travel relative to a split nut mounted on a threaded shaft. In normal use of the service brake when hydraulic pressure moves the actuator piston, the actuator piston moves relative to the split nut engaged on the threaded shaft. As the brake pads wear so the actuator piston, during normal service brake use, moves the split nut to a new position along the threaded shaft, a ratchet mechanism preventing return movement of the split nut. On operation of the handbrake the threaded shaft is axially moved so that interengaged conical surfaces on the split nut and actuator piston cause the split nut to firmly grip the threaded shaft. A direct connection is thus made between the actuator piston and the threaded shaft and as the split nut is adjusted along the threaded shaft during service brake operation, the threaded shaft always has to only be moved a specific distance for handbrake operation, irrespective of the pad wear.

A further brake adjuster is disclosed in our British patent specification No. 1,152,712. This adjuster comprises a linear ratchet having a first elongate member secured to an actuator piston which, in use, engages a friction pad assembly, and a second member within which said first member is housed. The first elongate member has a series of teeth which engage with a series of teeth provided on the inside surface of the second member. The teeth on said second member are of sharks tooth configuration and by the toothed portions of said second member flexing, the first member may be moved axially out of the second member. However, the sharks tooth configuration prevents return movement of said first member during normal brake usage. Thus it will be appreciated that during normal service brake usage the actuator piston is moved by hydraulic pressure, pad wear resulting in the first member of the actuator being moved out of the said second member. Handbrake operation relies on axial movement of said second member, a clutch engaging the second member to move the ratchet tooth configuration into locking engagement with the first member and thus firmly connecting said second member to the actuator piston. Due to the adjustment of the first member relative to the second member during service brake operation, the second member always has to be moved only a specific axial distance for handbrake operation, irrespective of pad wear. A disadvantage with this type of adjuster is that upon actuation of the handbrake the ratchet teeth formed on first and second members do not necessarily mesh but can initially confront each other. Further application of the handbrake can then provide sufficient additional force such that stripping of the teeth can result.

In both of the above described known adjusters the return travel of the actuator piston is limited at all times and the adjusters lock in the event of knockback of the actuator piston, "knockback" being the intermittent contact between the disc and the friction pad in the brakes released condition which causes the actuator piston to be "knocked" into the piston cylinder such that an excessive clearance is obtained. Also, with these types of adjuster overadjustment is possible, the adjusters locking in an advanced position wherein the friction pad is continuously pressed against the disc causing heat to be generated. This may lead to a high wear rate of friction material, fade, braking instability, excessive fuel consumption or even vaporisation of hydraulic fluid. Such overadjustment can occur during heavy braking when the brake and pad assembly actually flex due to the forces involved.

In certain further known adjusters utilising a slit nut which can grip a threaded shaft connected to an actuator piston, conical surfaces on the slit nut and actuator piston are biassed together so that at all times the slit nut exerts at least a minimum pressure on the threaded shaft and thus grips the threaded shaft. This is clearly disadvantageous as it provides a resistance to the axial movement of the threaded shaft at all times and thus hinders normal braking movement of the actuator piston.

An aim of the present invention is to provide an adjuster for vehicle brakes, which does not hinder normal service brake operation, does not lock in the event of knockback and is not overadjusted in a non-returnable manner during heavy braking.

According to the present invention there is provided an automatic adjuster for a hydraulic actuator for a vehicle brake comprising a clutch mechanism operative between a piston of the actuator and an auxiliary mechanical actuator, the clutch mechanism comprising a first member and a second member, one of said first and second members being connected to the actuator piston for axial movement therewith at all times, and the other of said first and second members being connectible with the mechanical actuator, said one of the first and second members being freely movable in both directions of movement of the actuator piston and means being provided so that the first and second members grip together only upon actuation of the mechanical actuator.

Thus with an adjuster constructed according to the present invention the clutch mechanism only engages when the mechanical actuator is operated i.e. when the handbrake is operated. During normal operation of the service brake, hydraulic pressure operates the actuator piston, the first or second member connected to the piston, moving freely with the piston, the clutch mechanism being completely disengaged. In the event of knockback the actuator piston is free to return, the clutch mechanism being disengaged. However, continued service brake use will, due to pad wear, adjust the normal position of the member of the clutch mechanism attached to the actuator piston relative to the other of said first and second members, so that on actuation of the mechanical actuator the handbrake will always require the same movement to apply the pad to the disc.

In one embodiment of the present invention the adjuster is located in a housing and the said first member of the clutch mechanism is an elongate cylindrical rod which has a fast thread on its outer periphery, one end of the rod being secured by a rotatable bearing e.g. needle or roller bearing, to the actuator piston so that the rod can rotate about its longitudinal axis. The said second member of the clutch mechanism is a slit nut, the thread of which is complementary to the fast thread of the first member. The slit nut has a conical surface which can be engaged by a complementary surface on a lip of a hollowed out piston, which hollowed out piston is connected with the mechanical actuator. A spring biasses the slit nut towards said hollowed out piston, though during normal service brake applications the slit nut is biassed against a shoulder of the housing and does not engage the said hollowed out piston. Thus, during a service brake application the actuator piston moves under hydraulic pressure, the threaded rod rotating freely in the slit nut and moving axially with the actuator piston. As pad wear occurs so the rest or normal position of the actuator piston and the threaded rod is adjusted. Only when the mechanical actuator i.e. handbrake, is operated, does the said hollowed out piston engage the slit nut causing the slit nut to grip the threaded rod and prevent relative movement therebetween. Thus, in the event of knockback, the actuator piston and threaded rod are free to move to release any pressure.

Figure 2:
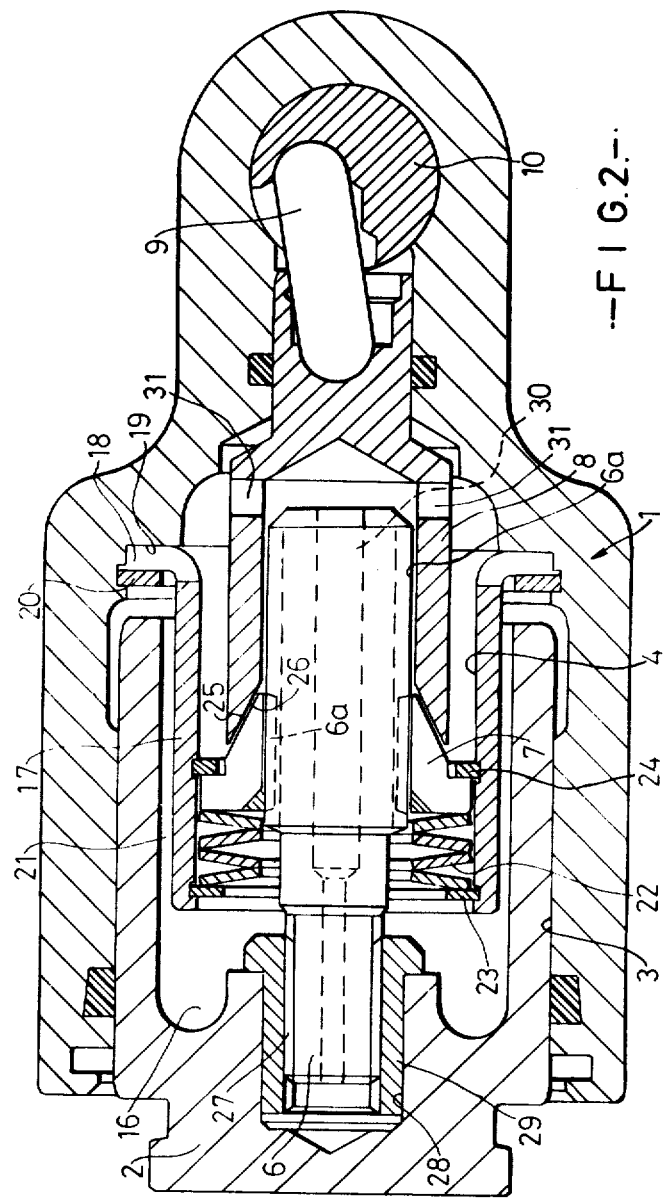

The present invention will now be further described, by way of example, with reference to the accompanying drawings, in which:

FIG. 1 is a cross-sectional view through one embodiment of an adjuster constructed according to the present invention; and FIG. 2 is a cross-sectional view through a modified form of the adjuster of FIG. 1.

The adjuster illustrated in FIG. 1 of the accompanying drawings is shown as applied to a sliding caliper disc brake, a sectional view through the actuating portion of the actuator housing 1 being shown. An actuating piston 2 is sealingly mounted in a bore 3 in the actuator housing 1, the housing being provided with a further smaller bore 4 defining an adjuster housing, the walls of which extend at 5 within piston bore 3. A clutch mechanism 6,7,8 is mounted in the end of bore 4. The clutch mechanism comprises a first member in the form of a rod 6 which is provided with a fast thread 6a on its periphery, a second member in the form of a slit nut 7 through which threaded rod 6 extends, the slit nut 7 being provided with a thread complementary to thread 6a, and a hollowed out piston 8 which is connected by a dolly 9 to an actuating shaft 10 of a mechanical actuator (not shown). Belleville springs 11 secured in bore 4 by a circlip 12 bias the slit nut towards a rest position against a shoulder 13 in bore 4. The slit nut 7 has a tapered surface 14 which is complementary to a chamfered lip surface 15 provided on hollowed out piston 8. During service brake applications the slit nut 7 remains in the rest position against shoulder 13, surfaces 14 and 15 on the slit nut and hollowed out piston respectively, being separated from each other (as illustrated) so that the threaded rod 6 which is rotatably secured to actuator piston 2 by bearing member 11a, can freely rotate in slit nut 7 as the actuator piston 2 moves axially back and forth.

During such a normal service brake application when hydraulic pressure is applied in chamber 16, the actuator piston 2 moves out of bore 3 to press a friction pad (not shown) against a disc, the threaded rod 6 rotating freely in slit nut 7 and moving with the piston 2. On release of the service brake the actuator piston returns into bore 3, threaded rod 6 winding itself freely back through slit nut 7. In the event of knockback the actuator piston 2 is free to move further into bore 3, threaded rod 6 winding further through slit nut 7. Also, as pad wear occurs the rod attains a new rest position relative to the slit nut 7. Thus, the same degree of rotation of actuating shaft 10 is always sufficient to apply the handbrake, the tapered surface 14 of slit nut 7 and the surface 15 of piston 8 then interengaging to cause the slit nut 7 to grip the threaded shaft 6 so as to prevent relative movement therebetween and to provide a direct connection between actuator shaft 10 and actuator piston 2. Upon release of the handbrake, slit nut 7 flexes to release threaded rod 6, and is biassed against shoulder 13, surfaces 14 and 15 being spaced apart. The clutch mechanism 6,7,8 is thus disengaged until the handbrake is once more applied.

The adjuster illustrated in FIG. 2 of the accompanying drawings is a modified form of the adjuster of FIG. 1 and the same reference numerals are used for equivalent parts. This adjuster has a hollow actuating piston 2 sealingly mounted in a bore 3 in the actuator housing 1, the actuator housing being provided with a further small bore 4 defined by a cylindrical adjuster housing or insert 17. Insert 17 has radially outwardly directed fingers 18 at one end thereof, which fingers engage between a shoulder 19 in bore 3 and a circlip 20 to secure the insert 17 within bore 3. The external diameter of insert 17 is smaller than the internal diameter of piston 2 so that the wall of piston 2 extends within the annular gap 21 between bore 3 and insert 17.

A clutch mechanism 6,7,8 is mounted in the bore 4 of adjuster housing 17. The clutch mechanism comprises a first member in the form of a cylindrical rod 6 which is provided with a fast thread 6a on its periphery, a second member in the form of slit nut 7 which is provided with a thread complementary to thread 6a, and a hollowed out piston 8 which is connected by a dolly 9 to an actuating shaft 10 of a mechanical actuator (not shown). A number of Belleville springs 22 are secured in the bore 4 between circlips 23 and 24, the springs biassing said slit nut 7 to a rest position against circlip 24. In this rest position the rod 6 is free to rotate in the slit nut 7 due to any axial movement of rod 6, inclined surfaces 25 and 26 on the slit nut 7 and hollowed out piston 8 respectively, being spaced apart from each other. Thus during normal service brake application the slit nut 7 remains in the rest position against circlip 24 and threaded rod 6 can move freely back and forth, rotating in the slit nut 7. When the handbrake is operated, actuator shaft 10 rotating, hollowed out piston 8 is moved to the left in FIG. 2 and surfaces 25 and 26 engage one another. Further axial movement of piston 8 compresses springs 22 and causes the slit nut 7 to flex inwardly to grip rod 6, this action being due to relative movement between inclined surfaces 25 and 26. Thus a direct connection is made between the actuator piston 2 to which threaded rod 6 is attached, and actuator shaft 10.

Threaded rod 6 is secured to actuating piston 2 by means of a fine thread 27, the thread 27 engaging in a complementary thread in an axial bore 27 in cylindrical insert 29, insert 29 being non-rotatably mounted i.e. an interference or press fit, in blind bore 28 in actuating piston 2. Alternatively insert 29 may be screwed into bore 28 or omitted, thread 27 engaging directly with the then threaded bore 28.

To facilitate assembly of this adjuster, axial bore 30 is provided in rod 6 and lateral bores 31 are provided in the walls of hollowed out piston 8. These bores 30,31 prevent air pockets forming within blind bore 28 and piston 8 when the adjuster is filled with hydraulic fluid ready for use. The provision of fingers 18 rather than a continuous flange, also facilitates bleeding of the adjuster.

During normal service brake application when hydraulic pressure is applied in chamber 16, the actuator piston 2 moves out of bore 3 to press a friction pad assembly (not shown) against a disc (not shown), the rod 6 rotating freely in slit nut 7 and moving with piston 2. On release of the service brake the actuator piston returns into bore 3, cylindrical rod 6 winding itself freely back through slit nut 7. In the event of knockback the actuator piston is free to move further into bore 2, cylindrical rod 6 winding further through slit nut 7. Also, as pad wear occurs, the cylindrical rod 6 attains a new rest position relative to the slit nut 7. Thus, the same degree of rotation of the actuator shaft is always sufficient to apply the handbrake, the inclined surfaces 25,26 interengaging only on handbrake application, to cause the slit nut 7 to flex to grip the threaded shaft so as to prevent relative movement therebetween and thus provide a direct connection between the actuator shaft 10 and the actuator piston 2. On releasing the handbrake the resilience of the slit nut 7 releases the locking grip of the slit nut 7 on rod 6.

It is appreciated that rotation of shaft 6 will cause shaft 6 to move axially relative to insert 29 in piston 2. Preferably the thread in the insert 29 is fine so that the axial movement between the rod 6 and piston 2 is small. This rotating connection is provided as it is cheaper to manufacture than that disclosed in FIG. 1.

In both of the above described embodiments the fast thread of rod 6 is always freely interengaged with the thread of slit nut 7 so that actuation of the handbrake at any time cannot damage these threads by the occurrence of wrong interengagement.

In the embodiments illustrated in FIGS. 1 and 2 it will be appreciated that due to manufacturing tolerances, the gap between the complementary surfaces on the slit nut 7 and hollowed out piston 8 can be larger than required. To overcome this problem it is possible to modify the embodiment of FIG. 2 by bending the fingers 18 of insert 17 into a U-shaped configuration and omitting the circlip 20 and housing shoulder 19. Thus the insert 17 with slit nut 7 and belleville springs 22 can be engaged as an interference fit in the housing 1, U-shaped fingers 18 gripping the housing wall. The insert can then be moved into the desired position within the housing, a feeler gauge being, for example, used to determine the desired position with the required spacing between the complementary surfaces on the slit nut 7 and hollowed out piston 8. This form of assembly reduces the possibility of rattle due to excessive manufacturing tolerances.

The present invention thus provides a simple but effective adjuster for vehicle brakes wherein, in the event of knockback, the adjuster does not lock but allows the actuator piston to freely move back, the threaded shaft being continuously adjusted within the slit nut. Also, the problem of overadjustment are not possible.

I claim:

1. An automatic adjuster for a hydraulic actuator for a vehicle brake comprising a housing, a clutch mechanism in said housing operative between a piston of the actuator and an auxiliary mechanical actuator, the clutch mechanism comprising a threaded rod and slit nut, the rod being threadedly engaged with said slit nut and one end of the rod being rotatably secured to the actuator piston for axial movement therewith at all times, said slit nut being biassed towards a rest position in which the slit nut engages a fixed stop, the threaded rod being freely rotatable and axially movable relative to said slit nut when the slit nut is in said rest position, said slit nut and threaded rod being constructed to grip together only upon actuation of the auxiliary mechanical actuator.

2. An adjuster according to claim 1, wherein said slit nut has a conical surface which can only be engaged by a complementary surface on an axially movable hollow piston when the mechanical actuator is operated, the interengaged complementary surfaces together with said fixed stop forming said means for causing the slit nut to flex to grip said threaded rod only when the mechanical actuator is operated.

3. An adjuster according to claim 1 or claim 2, wherein the fixed stop is formed by a shoulder provided within the housing of the actuator.

4. An adjuster according to claim 1 or claim 2, wherein the fixed stop is formed by a circlip fixed in an annular groove provided in a housing for the adjuster disposed within the actuator housing.

5. An adjuster according to claim 1 or 2, wherein the threaded rod has one threaded region for engaging the slit nut and another threaded region which is screwed into a threaded bore of a sleeve which is non-rotatably mounted in a recess in the actuator piston.

6. An adjuster according to claim 1 or 2, wherein the threaded rod has a bore extending longitudinally therethrough to facilitate assembly and bleeding of the hydraulic actuator.

* * * * *